US011954466B2

(12) United States Patent
Venkat et al.

(10) Patent No.: US 11,954,466 B2
(45) Date of Patent: Apr. 9, 2024

(54) METHODS AND APPARATUS FOR MACHINE LEARNING-GUIDED COMPILER OPTIMIZATIONS FOR REGISTER-BASED HARDWARE ARCHITECTURES

(71) Applicant: Intel Corporation, Santa Clara, CA (US)

(72) Inventors: Anand Venkat, San Jose, CA (US); Justin Gottschlich, Santa Clara, CA (US); Niranjan Hasabnis, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 17/561,417

(22) Filed: Dec. 23, 2021

(65) Prior Publication Data
US 2022/0121430 A1 Apr. 21, 2022

(51) Int. Cl.
*G06F 9/44* (2018.01)
*G06F 8/41* (2018.01)
*G06N 5/01* (2023.01)

(52) U.S. Cl.
CPC .............. *G06F 8/443* (2013.01); *G06N 5/01* (2023.01)

(58) Field of Classification Search
None
See application file for complete search history.

(56) References Cited

U.S. PATENT DOCUMENTS

| 2019/0303762 A1* | 10/2019 | Sui ........................... G06N 3/04 |
| 2020/0183476 A1* | 6/2020 | Honnavara-Prasad ... G06F 1/28 |
| 2021/0124739 A1* | 4/2021 | Karanasos ............... G06N 5/01 |
| 2022/0051104 A1* | 2/2022 | Interlandi .............. G06N 3/045 |
| 2022/0374723 A1* | 11/2022 | Blukis .................... G06N 3/092 |

OTHER PUBLICATIONS

CA2953959, Eng text (Year: 2018).*
CN111209095 , Eng text (Year: 2020).*
(Continued)

*Primary Examiner* — Insun Kang
(74) *Attorney, Agent, or Firm* — HANLEY, FLIGHT & ZIMMERMAN, LLC

(57) ABSTRACT

Methods, apparatus, systems, and articles of manufacture are disclosed that perform machine learning-guided compiler optimizations for register-based hardware architectures. Examples disclosed herein include a non-transitory computer readable medium comprising instructions that, when executed, cause a machine to at least select a register-based compiler transformation to apply to source code at a current position in a search tree, determine whether the search tree is in need of pruning based on an output of a query to a machine learning (ML) model, in response to determining the search tree is in need of pruning, prune the search tree at the current position, in response to applying the selected register-based compiler transformation to the source code, generate a code variant, calculate a score associated with the source code at the current position in the search tree, and update parameters of the machine learning (ML) model to include the calculated score.

25 Claims, 11 Drawing Sheets

(56) References Cited

OTHER PUBLICATIONS

Gottschlich et al., "The Three Pillars of Machine Programming," Proceedings of the 2nd Acm Sigplan International Workshop on Machine Learning and Programming Languages (MAPL), pp. 69-80, Jun. 2018, 11 p.

Barthou et al., "On the Decidability of Phase Ordering Problem in Optimizing Compilation," ACM International Conference on Computing Frontiers, May 2006, Ischia, Italy, pp. 147-156, 11 pages.

Zheng et al., "Ansor: Generating High-Performance Tensor Programs for Deep Learning," Proceedings of the 14th USENIX Symposium on Operating Systems Design and Implementation, Nov. 4-6, 2020, 18 pages.

Baghdadi et al., "A Deep Learning Based Cost Model for Automatic Code Optimization," 4th Conference on Machine Learning and Systems (MLSys' 21), 2021, 13 pages.

Adams et al., "Learning to Optimize Halide with Tree Search and Random Programs," ACM Trans. Graph. 38, 4, Article 121, Jul. 2019, 12 pages.

Chen et al., "Learning to Optimize Tensor Programs," 32nd Conference on Neural Information Processing Systems (NeurIPS 2018), Montréal, CA, 2018, 12 pages.

Mullapudi et al., "Automatically Scheduling Halide Image Processing Pipelines," ACM Trans. Graph., vol. 35, No. 4, Article 83, Jul. 2016, 11 pages.

Kennedy, "Fast Greedy Weighted Fusion," Proceedings of the 14th International Conference on Supercomputing (ICS '00), New York, US, 2000, 10 pages.

Jangda et al., "An effective fusion and tile size model for optimizing image processing pipelines," Proceedings of ACM SIGPLAN Symposium on the Principles and Practice of Parallel Programming, Vosendorf, AT, Feb. 2018 (PPOPP'18), 15 pages.

Patabandi et al., "Predictive Data Locality Optimization for Higher-Order Tensor Computations," Proceedings of the 5th ACM SIGPLAN International Symposium on Machine Programming (MAPS 2021), 10 pages.

* cited by examiner

FIG. 3A

305 — INITIAL:

```
/*FORWARD CONVOLUTION (STRIDE-1)*/
FOR(N=0; N<N++)(/*MINI-BATCH*/
FOR(KB=0;KB<K;KB++){/*OUTPUT CHANNELS(OUTER)*/
FOR(CB=0;CB<C;CB++){/*INPUT CHANNELS (OUTER)*/
FOR (H=0; H<H,H++){/*HEIGHT*/
FOR(W=0;W<W,W++){/* WIDTH*/
FOR(R=0;R<R,R++){/*FILTER HEIGHT */
FOR(S=0;S<S;S++){/* FILTER WIDTH */
FOR(C=0; C<16;C++){/*INPUT CHANNELS (INNER) */
    OUTPUT[N][KB][H][W][0:15] +=
    INPUT[N][CB][H+R][W+S][C]*
    WEIGHTS[KB][CB][R][S][C][0:15]
}}}}}}}}
```

310 — AFTER SCALAR REPLACEMENT:

```
/*FORWARD CONVOLUTION (STRIDE-1)*/
FOR(N=0; N<N++)(/*MINI-BATCH*/
FOR(KB=0;KB<K;KB++){/*OUTPUT CHANNELS(OUTER)*/
FOR(CB=0;CB<C;CB++){/*INPUT CHANNELS (OUTER)*/
FOR (H=0; H<H,H++){/*HEIGHT*/
FOR(W=0;W<W,W++){/* WIDTH*/
  VREG T=OUTPUT[N][KB][H][W][0:15];
  FOR(R=0;R<R;R++){/*FILTER HEIGHT */
  FOR(S=0;S<S;S++){/* FILTER WIDTH */
  FOR(C=0; C<16;C++){/*INPUT CHANNELS (INNER) */
    T += INPUT[N][CB][H+R][W+S][C]*
    WEIGHTS[KB][CB][R][S][C][0:15];
  }}}
  OUTPUT[N][KB][H][W][0:15] =T;
}}}}}
```

FIG. 3B

305 — INITIAL: (same as above)

315 — AFTER UNROLL-AND-JAM (AND SCALAR REPLACEMENT):

```
/*FORWARD CONVOLUTION (STRIDE-1)*/
FOR(N=0; N<N++)(/*MINI-BATCH*/
FOR(KB=0;KB<K;KB++){/*OUTPUT CHANNELS(OUTER)*/
FOR(CB=0;CB<C;CB++){/*INPUT CHANNELS (OUTER)*/
FOR (H=0; H<H,H++){/*HEIGHT*/
FOR(W=0;W<W,W+=2){/* WIDTH*/
  FOR(R=0;R<R,R++){/*FILTER HEIGHT */
  FOR(S=0;S<S;S++){/* FILTER WIDTH */
  FOR(C=0; C<16;C++){/*INPUT CHANNELS (INNER) */
    VREG T = WEIGHTS[KB][CB][R][S][C][0:15];
    OUTPUT[N][KB][H][W][0:15] +=
    INPUT[N][CB][H+R][W+S][C]*
    OUTPUT[N][KB][H][W+1+S][C]*T;
    INPUT[N][CB][H+R][W+1+S][C]*T;
  }}}
}}}}}
```

FIG. 3C

305 — INITIAL:

```
/*FORWARD CONVOLUTION (STRIDE-1)*/
FOR(N=0; N<N++)(/*MINI-BATCH*/
FOR(KB=0;KB<K;KB++){/*OUTPUT CHANNELS(OUTER)*/
FOR(CB=0;CB<C;CB++){/*INPUT CHANNELS (OUTER)*/
FOR (H=0; H<H,H++){/*HEIGHT*/
FOR(W=0;W<W,W++){/* WIDTH*/
FOR(R=0;R<R,R++){/*FILTER HEIGHT */
FOR(S=0;S<S;S++){/* FILTER WIDTH */
FOR(C=0; C<16;C++){/*INPUT CHANNELS (INNER) */
OUTPUT[N][KB][H][W][0:15] +=INPUT[N][CB][H+R][W+S][C]*
    WEIGHTS[KB][CB][R][S][C][0:15]
}}}}}}}
/*BIAS ADD */
FOR(N=0;N<N;N++)(/*MINI-BATCH*/
FOR(KB=0;KB<K;KB++){/*OUTPUT CHANNELS (OUTER)*/
FOR(H=0;H<H,H++){/*HEIGHT*/
FOR(W=0;W<W,W++){/* WIDTH*/
  OUTPUT[N][KB][H][W][0:15] +=BIAS[KB][0:15]
}}}}
```

320 — AFTER LOOP FUSION (AND SCALAR REPLACEMENT):

```
/*FORWARD CONVOLUTION (STRIDE-1)*/
FOR(N=0; N<N++)(/*MINI-BATCH*/
FOR(KB=0;KB<K;KB++){/*OUTPUT CHANNELS(OUTER)*/
FOR (H=0; H<H,H++){/*HEIGHT*/
FOR(W=0;W<W,W+=2){/* WIDTH*/
  VREG T=OUTPUT[N][KB][H][W][0:15];
  FOR(CB=0;CB<C;CB++){/*INPUT CHANNELS (OUTER)*/
  FOR(R=0;R<R,R++){/*FILTER HEIGHT */
  FOR(S=0;S<S;S++){/* FILTER WIDTH */
  FOR(C=0; C<16;C++){/*INPUT CHANNELS (INNER) */
    T += INPUT[N][CB][H+R][W+S][C]*
    WEIGHTS[KB][CB][R][S][C][0:15];
  }}}
  T +=BIAS[N][KB][H][W][0:15]=T
}}}}
```

INITIAL:
/*FORWARD CONVOLUTION (STRIDE-1)*/
FOR(N=0; N<N,N++){/*MINI-BATCH*/
FOR(KB=0;KB<K;KB++){/*OUTPUT CHANNELS(OUTER)*/
FOR(CB=0;CB<C;CB++){ /*INPUT CHANNELS (OUTER)*/
FOR (H=0; H<H,H++){/*HEIGHT*/
FOR(W=0,W<W, W++){/* WIDTH*/
FOR(R=0;R<R,R++){/*FILTER HEIGHT */
FOR(S=0,S<S,S++){/* FILTER WIDTH */
FOR(C=0; C<16;C++){/*INPUT CHANNELS (INNER) */
   OUTPUT[N][KB][H][W][0:15] +=
   INPUT[N][CB][H+R][W+S][C]
   WEIGHTS[KB][CB][R][S][C][0:15]
}})))))))

305

| ARRAY/TENSOR | DEPENDENCE VECTOR |
|---|---|
| OUTPUT | [0,0,64,0,0,3,64] DERIVED LOOPS(COUPLED INDICES) |
| INPUT | [0,12,0,3,3,3,0] STENCIL PATTERN(COUPLED INDICES) |
| WEIGHTS | [128, 0,0,56,56,0,0,0] |

| ACTION | SEMANTICS |
|---|---|
| FUSE | 0- NO FRUSION AT CURRENT LOOP LEVEL<br>1- IF FOR ANY ARRAY ALL LOOPS THAT DON'T CARRY DEPENDENCES ARE ABOVE CURRENT LOOP, FUSE WITH ADJACENT LOOP NEST |
| LOOP INTERCHANGE | 0- IF NO MORE LOOPS EXIST, STOP<br>1- PICK AN AVAILABLE LOOP AND INTERCHANGE TO CONNECT POSITION |
| UNROLL-AND-JAM | 0- DO NOTHING IF UNROLL-AND-JAM ILLEGAL/CURRENT DOES NOT CARRY A DEPENDENCE<br>1- UNROLL-AND-JAM OTHERWISE |
| SCALAR REPLACEMENT | 0- IF CURRENT LOOP LEVEL DOES NOT CARRY A DEPENDENCE<br>1- SCALAR REPLACE OTHERWISE |

FIG. 6

METHODS AND APPARATUS FOR MACHINE LEARNING-GUIDED COMPILER OPTIMIZATIONS FOR REGISTER-BASED HARDWARE ARCHITECTURES

FIELD OF THE DISCLOSURE

This disclosure relates generally to compiler optimizations and, more particularly, to methods and apparatus for machine learning-guided compiler optimizations for register-based hardware architectures.

BACKGROUND

In recent years, the field of software development has grown rapidly. Generally, achieving peak performance for High Performance Computing (HPC) and Machine Learning (ML) applications on modern Central Processing Unit (CPU) architectures is a primary goal of automated software development. Register-based compiler optimizations (e.g., scalar replacement, unroll and jam, etc.) may be utilized to improve application performance on CPU architecture.

BRIEF DESCRIPTION OF THE DRAWINGS

FIGS. 3A-3C illustrate example compiler transformations performed on example source code to improve application performance.

FIG. 4 depicts an example dependence vector representation of example source code for 2-dimensional convolution.

FIG. 6 illustrates an example encoding for actions representing compiler optimizations that correspond to edges in an example search tree.

Figure 1:
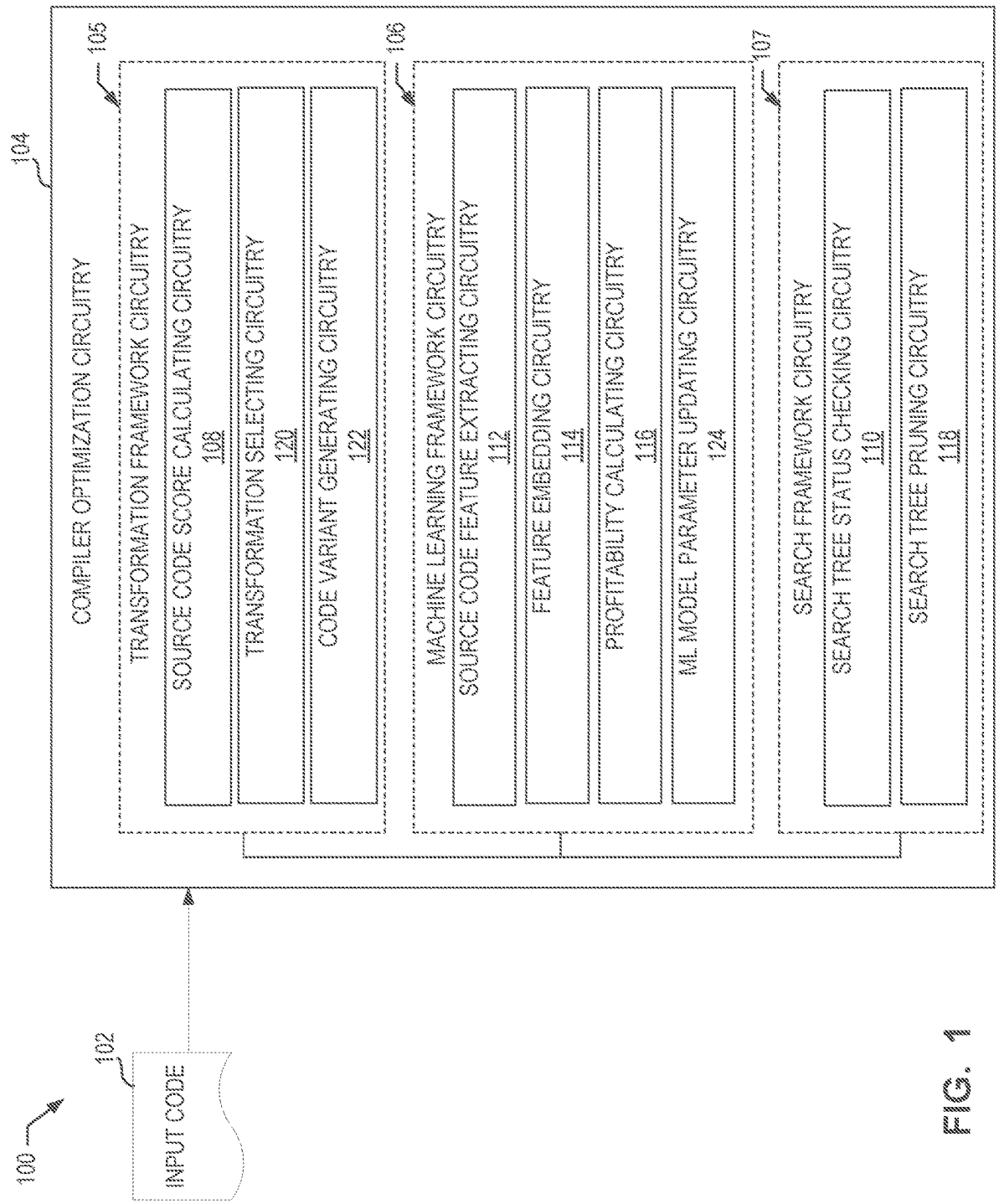
FIG. 1 is a block diagram of an example implementation of compiler optimization circuitry, within an example compiler optimization system, to improve application performance on CPU architecture.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third." etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors. Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Artificial intelligence (AI), including machine learning (ML), deep learning (DL), and/or other artificial machinedriven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a Convolutional Neural Network (CNN) model is used. Using a Convolutional Neural Network (CNN) model enables the interpretation of data using weighted importance. In general, machine learning models/architectures that are suitable to use in the example approaches disclosed herein will be Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein. ML/AI models are trained using code variants obtained by applying register-based compiler transformations and their associated scores. However, any other training algorithm may additionally or alternatively be used. In examples disclosed herein, training is performed until a maximum depth of the search tree is reached.

In some examples, the ML/AI models may be additionally trained using scores associated with code variants (e.g., quantification of main memory accesses, etc.). However, any other training algorithm may additionally or alternatively be used. In some examples, training may be performed on all states of the machine learning model.

Training is performed using hyperparameters that control how the learning is performed (e.g., a learning rate, a number of layers to be used in the machine learning model, etc.)

Training is performed using training data. In examples disclosed herein, the training data originates from a local set of source code and/or code variants. However, any type of dataset of source code and/or code variants may be utilized.

The automation of software development using machine-learning (ML) techniques for modern hardware architectures (e.g., Central Processing Units (CPUs), Graphics Processing Units (GPUs), Field Programmable Gate Arrays (FPGAs), etc.) involves the training and deployment of machine-learning models to facilitate identification of code development paths that yield high performance.

Current approaches to achieving peak performance for high performance computing (HPC) and machine learning (ML) applications on modern architectures are challenging and require a great deal of effort and time from teams of experts and/or software developers.

Typically, chip vendors, including Intel, ship software libraries such as the Math Kernel Library (MKL) for efficient implementations of High Performance Computing (HPC) and Machine-Learning (ML) applications. These libraries focus on small kernels and efficiently optimize them in the belief that the kernels constitute a big share of the running time of the application. However, other optimizations that consider the application context surrounding multiple kernels (e.g., compiler transformations such as fusion) are potentially required to achieve peak performance.

Machine learning applications, such as Convolutional Neural Networks (CNN) have such kernels stacked in large code sequences and require such compiler-based optimizations for state-of-the-art performance. However, compilers do have shortcomings as well. The out-of-the-box performance achieved by ML compilers on such applications does not achieve peak possible performance because predicting the optimal sequence and/or type of compiler transformations for a particular application is practically difficult, the combinatorial search space of transformations tends to be prohibitively huge, and the optimizations are not portable across architectures and hardware generations.

Example methods and apparatus disclosed herein restrict the search space of possible optimizations to compiler transformations that only target exploitation of data reuse from registers, thus ensuring that optimized code does not degrade the performance of the initial code, formulate an accurate cost metric for transformed code variants by quantifying accesses to main memory, rank code variants that involve a higher reuse of data from registers (e.g., lower cost metric), and automatically identifying an optimal transformation sequence at a low computing cost using machine learning-based tree search algorithms (e.g., Monte Carlo Tree Search (MCTS)). Having the ability to restrict the search space by only focusing on register-based optimizations and to calculate an accurate cost metric for transformed code variants, rank them accordingly, and identify the optimal transformation sequence using an ML model allows for scalability across multiple hardware architectures and/or hardware generations and the achievement of peak application performance on CPUs with minimal computational cost.

In examples disclosed herein, open-source compilation frameworks such as the Multi-Level Intermediate Representation (MLIR) and/or Low Level Virtual machine (LLVM) may be utilized. Additionally, in examples disclosed herein, tensor compiler frameworks such as TensorFlow and PyTorch may also be used. In other examples, however, any other type of compilation frameworks may be utilized.

In examples disclosed herein, a Monte-Carlo Tree Search (MCTS) algorithm is used as the search methodology to explore the combinatorial search space of code variants derived from the set of register-based optimizations due to its incorporation of stochasticity for exploring paths chosen with a degree of randomness, however, in some examples, any other type of search methodology may be utilized.

In examples disclosed herein, "register-based compiler optimizations" may hereinafter be referred to interchangeably as "register optimizations," "compiler optimizations," register-based optimizations," register-based transformations," and/or "compiler transformations." Additionally, in examples disclosed herein, "state" may hereinafter be used interchangeably with "code variant" to represent a transformed piece of code and/or a node in the search tree.

FIG. 1 illustrates an example implementation of compiler optimization circuitry 104, within an example compiler optimization system 100, to improve application performance on CPU architecture. An example input code 102 is received by compiler optimization circuitry 104, wherein it is used by example transformation framework circuitry 105, containing example source code score calculating circuitry 108, example transformation selecting circuitry 120, and example code variant generating circuitry 122, example machine learning framework circuitry 106, containing example source code feature extracting circuitry 112, example feature embedding circuitry 114, example profitability calculating circuitry 116, an example machine learning (ML) parameter updating circuitry 124, and example search framework circuitry 107, example search tree status checking circuitry 110, and search tree pruning circuitry 118. In some examples, the input code 102 may be located within a larger database of source code and/or code variants.

The example source code score calculating circuitry 108 evaluates the input code 102 and determines its associated score. The score determined by the source code score calculating circuitry 108 directly corresponds to the number of memory loads and/or stores eliminated from main memory and/or a CPU cache by reusing data from registers. In examples disclosed herein, the memory load and/or store count is inversely proportional to the score of the input code 102 established by the source code score calculating circuitry 108.

The example search tree status checking circuitry 110 keeps track of a current position in a search tree, checking to see if a maximum depth has been reached in the tree during searches, as well as determining whether the current position in the search tree is at the root. In examples disclosed herein, when the search tree status checking circuitry 110 determines that a maximum depth has been reached and the current position is not at the root of the tree, the search tree status checking circuitry 110 returns the current position to the parent node in the search tree. Additionally, in examples disclosed herein, if the search tree status checking circuitry 110 determines that the current position is at the root of the search tree, the process is subsequently ended.

The example source code feature extracting circuitry 112 evaluates the input code 102 and extracts source code features (e.g., array accesses, loop bounds, score of code variant, etc.) from each state (e.g., code variant). In examples disclosed herein, feature extraction is utilized by the source code feature extracting circuitry 112 to parse the source code, however, in other examples, any type of dimensionality-reduction algorithm (e.g., classification) can be used.

The example feature embedding circuitry 114 receives the extracted feature dependencies (e.g., array accesses, loop bounds, code variant score, etc.) from the source code feature extracting circuitry 112 and embeds the extracted features into a feature vector representation. In examples disclosed herein, one-hot encoding is used by the feature embedding circuitry 114 to embed the extracted features and the score associated with the code variant into the feature vector, however, any other type of feature embedding algorithm may be utilized.

The example profitability calculating circuitry 116 utilizes a machine learning (ML) model to correlate the features contained within the feature vector representation generated by the feature embedding circuitry 114 with the profitability of exploring child states reached from the current state (i.e. code variant).

The example search tree pruning circuitry 118 uses the profitability calculation performed by the profitability calculating circuitry 116 and compares it against a threshold value to determine whether the search tree needs to be pruned at the current position. In examples disclosed herein, the threshold value for profitability is a pre-determined value.

The example transformation selecting circuitry 120 determines, using a selection algorithm (e.g., random selection), what register-based transformation to apply to the received input code 102.

The example code variant generating circuitry 122 then applies the selected register-based transformation (e.g., scalar replacement, unroll and jam, fusion, loop interchange, etc.) to the input code 102 to generate a new code variant.

In examples disclosed herein, scalar replacement refers to an example of a register-based compiler transformation wherein repeatedly-referenced array accesses are identified and copied into a scalar format. The desired computation is then carried out using the scalar and subsequently copied back into the original array once the computation is complete, thus avoiding unnecessary memory load and/or store operations associated with the array.

In examples disclosed herein, unroll-and-jam refers to an example of a register-based compiler transformation wherein the reuse of a register across multiple independent computations that reference the same register is facilitated. Additionally, unroll-and-jam promotes Instruction Level Parallelism (ILP), which is the parallel execution of sequential instructions in a program.

In examples disclosed herein, fusion refers to an example of a register-based compiler transformation that achieves reuse of array elements that are referenced in two separate loop nests by fusing the statements of both nests together, thus avoiding unnecessary memory loads of array elements.

In examples disclosed herein, loop interchange is an example of a register-based compiler transformation wherein optimal loop order is achieved to maximize performance (e.g., switching an inner loop to an outer loop, etc.).

The example code variant generating circuitry 122 applies the register-based compiler transformation that was selected by the transformation selecting circuitry 120 to the input code 102 to generate a new code variant. The code variant generating circuitry 122 then updates the set of input code 102 to include the new code variant.

The example machine learning (ML) model parameter updating circuitry 124 recursively iterates through the search tree, when the ML model is in a training mode, and calculates and updates the scores associated with each of the code variants in the search tree, until the root node is reached.

In some examples, the source code score calculating circuitry 108 of FIG. 1 includes means for calculating a score based on a quantification of memory load and/or store operations in the source code. For example, the means for calculating a score based on a quantification of memory load and/or store operations in the source code may be implemented by source code calculating circuitry 108. In some examples, source code calculating circuitry 108 may be implemented by machine executable instructions such as that implemented by at least block 213 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the source code score calculating circuitry 108 is implemented by other hardware logic circuitry, hardware implemented state machines, and/or any other combination of hardware, software, and/or firmware. For example, the source code score calculating circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the search tree status checking circuitry 110 of FIG. 1 includes means for keeping track of a current position within the search tree and determining whether a maximum depth and/or the root node has been reached. For example, the means for keeping track of a current position within the search tree and determining whether a maximum depth and/or the root node has been reached may be implemented by search tree status checking circuitry 110. In some examples, search tree status checking circuitry 110 may be implemented by machine executable instructions such as that implemented by at least blocks 206, 208, 210 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the search tree status checking circuitry 110 is implemented by other hardware logic circuitry, hardware implemented state machines, and/or any other combination of hardware, software, and/or firmware. For example, the search tree status checking circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the source code feature extracting circuitry 112 includes means for extracting feature dependencies from the source code (e.g., input code 102 from FIG. 1). For example, the means for extracting feature dependencies from the source code (e.g., input code 102 from FIG. 1) may be implemented by source code feature extracting circuitry 112. In some examples, the source code feature extracting circuitry 112 may be implemented by machine executable instructions such as that implemented by at least block 216 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the source code feature extracting circuitry 112 is implemented by other hardware logic circuitry, hardware implemented state machines, and/or any other combination of hardware, software, and/or firmware. For example, the source code feature extracting circuitry 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the feature embedding circuitry 114 of FIG. 1 includes means for embedding the extracted feature dependencies into a feature dependency vector for input into a ML model. For example, the means for embedding the extracted feature dependencies into a feature dependency vector for input into a ML model may be implemented by feature embedding circuitry 114. In some examples, the feature embedding circuitry 114 may be implemented by machine executable instructions such as that implemented by at least block 216 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the feature embedding circuitry 114 is implemented by other hardware logic circuitry, hardware implemented state machines, and/or any other combination of hardware, software, and/or firmware. For example, the feature embedding circuitry 114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the profitability calculating circuitry 116 of FIG. 1 includes means for calculating the profitability of exploring potential code variants based on the embedded features of the source code within the feature dependency vector. For example, the means for calculating the profitability of exploring potential code variants based on the embedded features of the source code within the feature dependency vector may be implemented by profitability calculating circuitry 116. In some examples, profitability calculating circuitry 116 may be implemented by machine executable instructions such as that implemented by at least block 218 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the profitability calculating circuitry 116 is implemented by other hardware logic circuitry, hardware implemented state machines, and/or any other combination of hardware, software, and/or firmware. For example, the profitability calculating circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the search tree pruning circuitry 118 of FIG. 1 includes means for determining whether a branch of the search tree requires pruning, based on the determined profitability, and the subsequent pruning, if needed. For example, the means for determining whether a branch of the search tree requires pruning, based on the determined profitability, and the subsequent pruning, if needed may be implemented by search tree pruning circuitry 118. In some examples, profitability calculating circuitry 116 may be implemented by machine executable instructions such as that implemented by at least blocks 220, 222 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the search tree pruning circuitry 118 is implemented by other hardware logic circuitry, hardware implemented state machines, and/or any other combination of hardware, software, and/or firmware. For example, the search tree pruning circuitry 118 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the transformation selecting circuitry 120 of FIG. 1 includes means for selecting a type of register-based compiler transformation to be applied to the source code in order to generate a new code variant. For example, the means for selecting a type of register-based compiler transformation to be applied to the source code in order to generate a new code variant may be implemented by transformation selecting circuitry 120. In some examples, transformation selecting circuitry 120 may be implemented by machine executable instructions such as that implemented by at least block 224 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the transformation selecting circuitry 120 is implemented by other hardware logic circuitry, hardware implemented state machines, and/or any other combination of hardware, software, and/or firmware. For example, the transformation selecting circuitry 120 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the code variant generating circuitry 122 of FIG. 1 includes means for applying the selected type of register-based compiler optimization to the source code to generate a new code variant and adding the newly-generated code variant to the set of code states. For example, the means for applying the selected type of register-based compiler optimization to the source code to generate a new code variant and adding the newly-generated code variant to the set of code states may be implemented by code variant generating circuitry 122. In some examples, code variant generating circuitry 122 may be implemented by machine executable instructions such as that implemented by at least blocks 226, 228 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the code variant generating circuitry 122 is implemented by other hardware logic circuitry, hardware implemented state machines, and/or any other combination of hardware, software, and/or firmware. For example, the code variant generating circuits 122 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the machine learning (ML) model parameter updating circuitry 124 of FIG. 1 includes means for recursively calculating and updating scores associated with each code variant in the search tree until the root node of the search tree is reached, if the ML model is in training mode. For example, the means for recursively calculating and updating scores associated with each code variant in the search tree until the root node of the search tree is reached, if the ML model is in training mode may be implemented by machine learning (ML) model parameter updating circuitry 124. In some examples, machine learning (ML) model parameter updating circuitry 124 may be implemented by machine executable instructions such as that implemented by at least blocks 230, 232 of FIG. 2 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the machine learning (ML) model parameter updating circuitry 124 is implemented by other hardware logic circuitry, hardware implemented state machines, and/or any other combination of hardware, software, and/or firmware. For example, the machine learning (ML) model parameter updating circuitry 124 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the compiler optimization circuitry 104 is illustrated in FIG. 1, one or more of the elements, processes, and/or devices illustrated in FIG. 1 may be combined, divided, re-arranged, omitted, eliminated, and/or implemented in any other way. Further, the example source code score calculating circuitry 108, the example search tree status checking circuitry 110, the example source code feature extracting circuitry 112, the example feature embedding circuitry 114, the example profitability calculating circuitry 116, the example search tree pruning circuitry 118, the example transformation selecting circuitry 120, the example code variant generating circuitry 122, the example machine leaning (ML) model parameter updating circuitry 124, and/or, more generally, the example compiler optimization circuitry 104 of FIG. 1, may be implemented by hardware, software, firmware, and/or any combination of hardware, software, and/or firmware. Thus, for example, any of the example source code score calculating circuitry 108, the example search tree status checking circuitry 110, the example source code feature extracting circuitry 112, the example feature embedding circuitry 114, the example profitability calculating circuitry 116, the example search tree pruning circuitry 118 the example transformation selecting circuitry 120, the example code variant generating circuitry 122, the example machine learning (ML) model parameter updating circuitry 124, and/or, more generally, the example compiler optimization circuitry 104 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example source code score calculating circuitry 108, the example search tree status checking circuitry 110, the example source code feature extracting circuitry 112, the example feature embedding circuitry 114, the example profitability calculating circuitry 116, the example search tree pruning circuitry 118, the example transformation selecting circuitry 120, the example code variant generating circuitry 122, and/or machine learning (ML) model parameter updating circuitry 124 is/are hereby expressly defined to include a non-transitory computer readable storage device or storage disk such as a memory, a digital versatile disk (DVD), a compact disk (CD), a Blu-ray disk, etc., including the software and/or firmware. Further still, the example compiler optimization circuitry 104 of FIG. 1 may include one or more elements, processes, and/or devices in addition to, or instead of, those illustrated in FIG. 1, and/or may include more than one of any or all of the illustrated elements, processes and devices.

Figure 2:
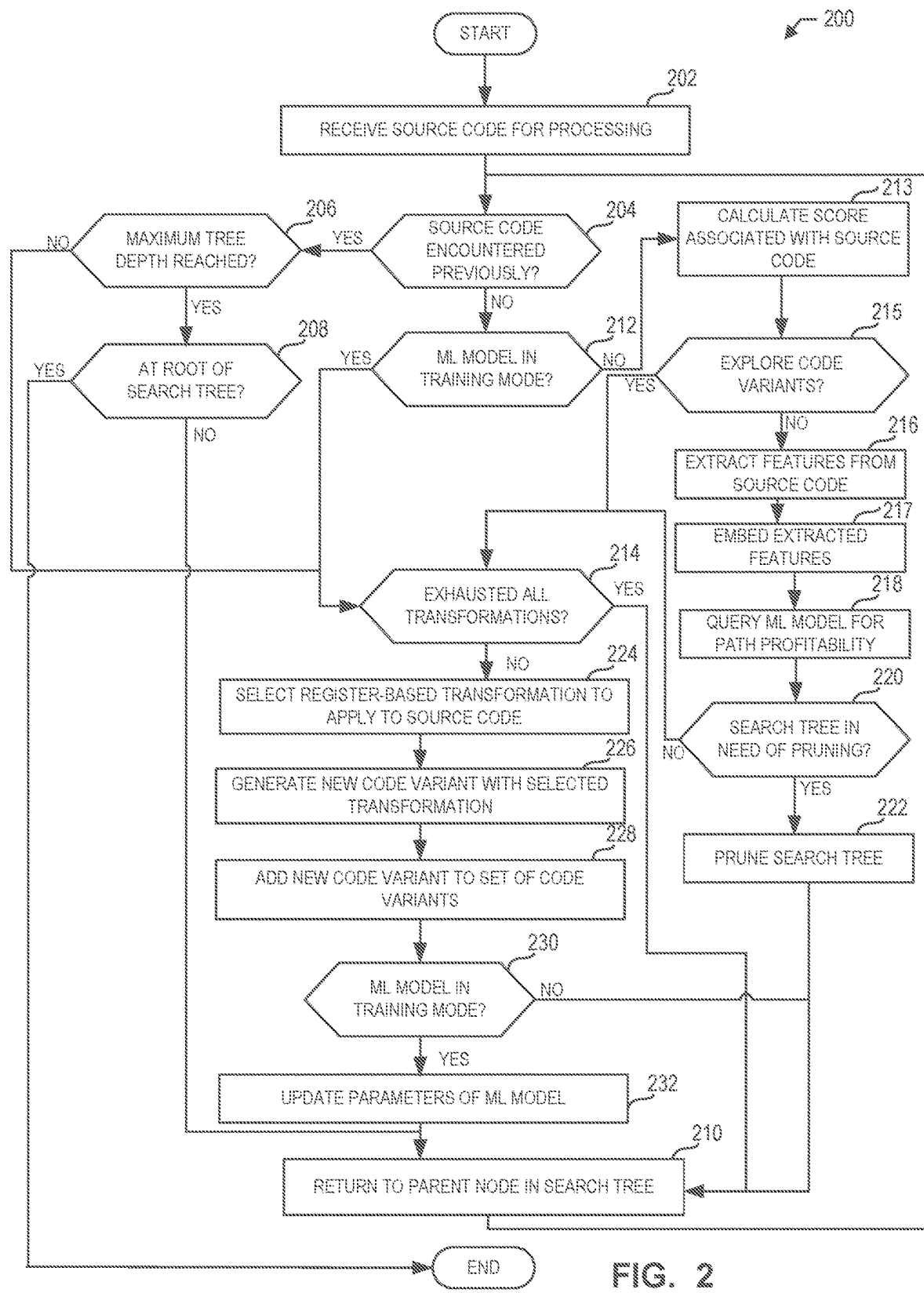
FIG. 2 is a flowchart representative of example machine readable instructions that may be executed by example processor circuitry to implement the example compiler optimization system of FIG. 1, in accordance with the teachings of this disclosure.

A flowchart representative of example hardware logic circuitry, machine readable instructions, hardware implemented state machines, and/or any combination thereof for implementing the compiler optimization circuitry 104 of FIG. 1 is shown in FIG. 2. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device) Similarly, the non-transitory computer readable storage media may include one or more mediums located in one or more hardware devices. Further, although the example program is described with reference to the flowchart illustrated in FIG. 9, many other methods of implementing the example compiler optimization circuitry 104 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing de % ice and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in w hole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++. Java, C#, Perl, Python. JavaScript, HyperText Markup Language (HTML), Structured Query Language (SQL), Swift, etc.

As mentioned above, the example operations of FIG. 2 may be implemented using executable instructions (e.g., computer and/or machine readable instructions) stored on one or more non-transitory computer and/or machine readable media such as optical storage de % ices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A. B, and/or C refers to any combination or subset of A. B. C such as (1) A alone, (2) B alone. (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B. or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"). "one or more", and "at least one" are used interchangeably herein. Furthermore, although individually listed, a plurality of means, elements or method actions may be implemented by, e.g., the same entity or object Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions and/or example operations 200 that may be executed and/or instantiated by processor circuitry, to find an optimal path of code development (e.g., maximizing CPU performance) for a given piece of source code. The machine readable instructions and/or operations 200 of FIG. 2 begin at block 202, at which the source code score calculating circuitry 108 of FIG. 1 receives source code for processing.

As illustrated in FIG. 2, at block 202, the source code score calculating circuitry 108 receives source code for processing. In examples disclosed herein, "source code" may refer to any piece of code upon which register-based compiler transformations can be applied to generate code variants (e.g., input code 102 of FIG. 1).

At block 204, the search tree status checking circuitry 110 establishes whether the source code received for processing in block 202 was encountered previously. If the search tree status checking circuitry 110 determines that the source code was seen before, the process moves forward to block 206. If the search tree status checking circuitry 110 establishes that the source code was not previously encountered, the process moves to block 212.

At block 206, the search tree status checking circuitry 110 determines whether a maximum depth of the search tree has been reached. In examples disclosed herein, the search tree status checking circuitry 110 establishes whether a maximum depth of the search tree has been reached by keeping track of a current position within the search tree and/or counting the number of nodes visited within the search tree. Additionally, in examples disclosed herein, the maximum depth of the search tree is a predetermined value. If the search tree status checking circuitry 110 determines that the maximum depth of the search tree has been reached, the process moves forward to block 208. If the search tree status checking circuitry 110 establishes that the maximum depth of the search tree has not been reached, the process moves to block 214.

At block 208, the search tree status checking circuitry 110 determines the current position is at the root of the search tree. In examples disclosed herein, the "root of the search tree" refers to the starting node and/or starting point of the search tree (e.g., the initial input code 102 of FIG. 1). If the search tree status checking circuitry 110 determines that the current position is indeed at the root of the search tree, the process is ended. However, if the search tree status checking circuitry 110 establishes that the current position is not at the root of the search tree, the process moves to block 210.

At block 210, the search tree status checking circuitry 110 returns the current position in the search tree to the parent node in the search tree In examples disclosed herein, the 'parent node' refers to the state (e.g., code variant) immediately preceding that of the current position Once the search tree status checking circuitry 110 returns the current position in the search tree to the parent node, the process returns to block 204 once again.

At block 212, the search tree status checking circuitry 110 determines whether the machine learning (ML) model is currently being trained. If the search tree status checking circuitry 110 establishes that the ML model is not in training mode, the process moves to block 213. However, if the search tree status checking circuitry 110 determines that the ML model is in training mode, the process moves to block 214. In some examples, the search tree status checking circuitry 110 may establish whether or not the ML model is in training mode by use of a training status identifier (e.g., Boolean variable, etc.).

At block 213, source code score calculating circuitry 108 calculates the score associated with the source code received for processing in block 202. In examples disclosed herein, the score calculated by the source code score calculating circuitry 108 directly corresponds to the number of memory loads and/or stores eliminated from main memory and/or a CPU cache by reusing data from registers. In examples disclosed herein, the memory load and/or store count is inversely proportional to the score of the source code (e.g., input code 102 of FIG. 1) established by the source code score calculating circuitry 108.

At block 215, source code score calculating circuitry 108 determines whether the score calculated in block 213 satisfies a threshold to further explore code variants In examples disclosed herein, the threshold against which the source code score calculating circuitry 108 compares the score against is a predetermined threshold. If the source code score calculating circuitry 108 determines that the score associated with the source code does not satisfy the given threshold value, the process moves to block 216. However, if the source code score calculating circuitry 108 determines that the score associated with the source code does satisfy the threshold, the process moves to block 214.

At block 216, source code feature extracting circuitry 112 extracts feature dependencies from the source code. In examples disclosed herein, source code features (e.g., array accesses, loop bounds, score of code variant, etc.) are extracted from each state (e.g., code variant). Additionally, in examples disclosed herein, feature extraction is utilized by the source code feature extracting circuitry 112 to parse the source code, however, in other examples, any type of dimensionality-reduction algorithm (e.g., classification, etc.) can be used.

At block 217, source code feature embedding circuitry 114 receives the extracted feature dependencies (e.g. array accesses, loop bounds, code variant score, etc.) from the source code feature extracting circuitry 112 (from block 216) and embeds the extracted features into a feature vector representation. In examples disclosed herein, one-hot encoding is used by the feature embedding circuitry 114 at block 217 to embed the extracted features and the score associated with the code variant into the feature vector, however, any other type of feature embedding algorithm may be utilized.

At block 218, profitability calculating circuitry 116 queries the machine learning (ML) model to determine the profitability of exploring further code variant paths for the current state (e.g., source code). The profitability calculating circuitry 116 leverages the machine learning (ML) model to correlate the embedded features with the profitability of exploring the child states reachable from the current state or code variant.

At block 220, search tree pruning circuitry 118 evaluates the profitability measure calculated by the profitability calculating circuitry 116 in block 218 and determines whether it satisfies a threshold for pruning. For example, if the profitability measure is below a minimum threshold value, the search tree pruning circuitry 118 would determine that the search tree is in need of pruning at the current state, thus limiting the search space exploration by pruning paths that are relatively less likely to lead to profitable states. If the search tree pruning circuitry 118 establishes that the search tree is in need of pruning, the process advances to block 222. However, if the search tree pruning circuitry 118 determines that the search tree is not in need of pruning, the process moves to block 214.

At block 222, search tree pruning circuitry 118 prunes the search tree at the current state. In examples disclosed herein. "pruning" refers to the process wherein a given section of the tree is removed after being deemed redundant and/or non-critical. Additionally, in examples disclosed herein, the type of search tree being pruned is a Monte Carlo search tree, however any other type of search tree may be utilized.

At block 214, transformation selecting circuitry 120 determines whether all possible register-based compiler transformations (e.g., scalar replacement, unroll and jam, loop fusion, etc.) that can be applied to a given piece of source code have been exhausted. If the transformation selecting circuitry 120 establishes that all possible transformations have been exhausted, the process moves to block 210. However, if the transformation selecting circuitry 120 establishes that all possible transformations have not yet been exhausted, the process moves forward to block 224.

At block 224, transformation selecting circuitry 120 selects a register-based compiler transformation (e.g., scalar replacement, unroll and jam, loop fusion, etc.) to be applied to the source code to generate a new optimized code variant. In examples disclosed herein, the transformation selecting circuitry 120 uses a random selection algorithm to choose a register-based compiler transformation, however, any other type of selection algorithm can be utilized.

At block 226, code variant generating circuitry 122 applies the register-based compiler optimization selected by the transformation selecting circuitry 120 in block 224 to the source code to generate a new code variant.

At block 228, code variant generating circuitry 122 adds the newly-generated code variants to the overall set of code variants. In examples disclosed herein, the set of code variants is represented as states in a Monte Carlo search tree, however, any other representation of code variants can be utilized.

At block 230, search tree status checking circuitry 110 checks if the machine learning (ML) model is currently in training mode, similar to block 212. If the search tree status checking circuitry 110 determines that the machine learning (ML) model is currently in training mode, the process moves forward to block 232. However, if the search tree status checking circuitry 110 establishes that the machine learning (ML) model is not currently in training mode, the process moves to block 210.

At block 232, machine learning (ML) model parameter updating circuitry 124 recursively calculates the score associated with search code variant (e.g., child state in search tree) and updates the machine learning (ML) model parameters to include the calculated score.

FIGS. 3A-3C illustrate example compiler transformations 300 performed on example source code 305 to improve application performance FIG. 3A demonstrates an example application of scalar replacement 310 on the source code 305. FIG. 3B shows an example application of unroll-and-jam 315 on the source code 305, and FIG. 3C illustrates an example application of loop fusion 320 on the source code 305.

FIG. 4 depicts an example dependence vector representation 400 of the example source code 305 for 2-dimensional convolution. The example dependence vector representation 400 includes example arrays/tensors 402 and their corresponding dependence vectors 404. For example, the output array 403 represented in the source code 305 has a corresponding output dependence vector 406, the input array 405 has a corresponding input dependence vector 408, and the weight array 409 has a corresponding weights dependence vector 410. In the example source code 305, the output array 403 is calculated using the following:

$$\text{output}[n][k_b][h][w][0:15] \mathrel{+}=$$
$$\text{input}[n][c_b][h+r][w+s][c] * \text{weights}[k_b][c_b][r][s][c][0:15].$$

Figure 5:
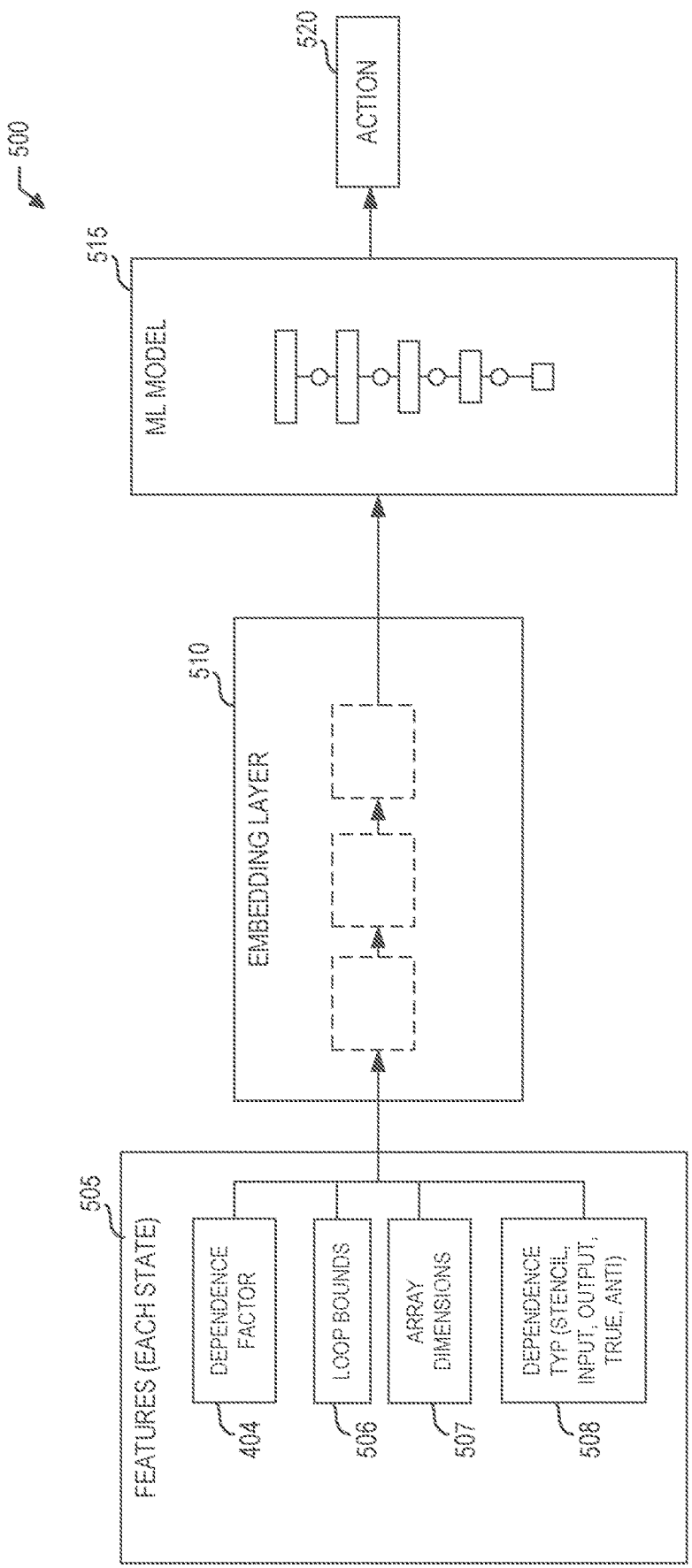
FIG. 5 shows an example embedding process utilizing the example dependence vector representation of FIG. 4.

FIG. 5 shows an example embedding process 500 utilizing the example dependence vector 404 of FIG. 4. The example features 505 represent the features extracted from the source code of each state in the search tree. The features 505 include the dependence vector 404 of FIG. 4, loop bounds 506, array dimensions 507, and dependence type 508 (e.g., stencil, input, output, true, anti, etc.). The features 505 represent the source code of each state in a manner that can be embedded as input to a machine learning (ML) model. In examples disclosed herein, loop bounds 506 represent the number of times a given loop (and the statements contained therein) are executed. The features 505 are then embedded in the embedding layer 510 for input into the ML model 515. In examples disclosed herein, one-hot encoding is used to embed the features 505, however, any other type of embedding algorithm and/or technique may be utilized. The embedded features within the embedding layer 510 are then passed along as input into the machine learning (ML) model 515. The ML model 515 correlates the embedded features within the embedding layer 510 with a profitability of exploring code variants. The profitability measure generated bs the ML model 515 is then mapped to an action 520 (e.g., apply a selected register-based compiler transformation on the code variant, prune the current state, etc.).

FIG. 6 illustrates an example encoding 600 for actions representing compiler optimizations that correspond to edges in the example search tree (e.g., Monte Carlo search tree). The example action 520 (e.g. fuse, loop interchange, unroll-and-jam, scalar replacement, etc.) is mapped to an encoded action 610. In examples disclosed herein, the encoded action 610 is generated using one-hot encoding, however, any other type of encoding technique may be utilized.

Figure 7:
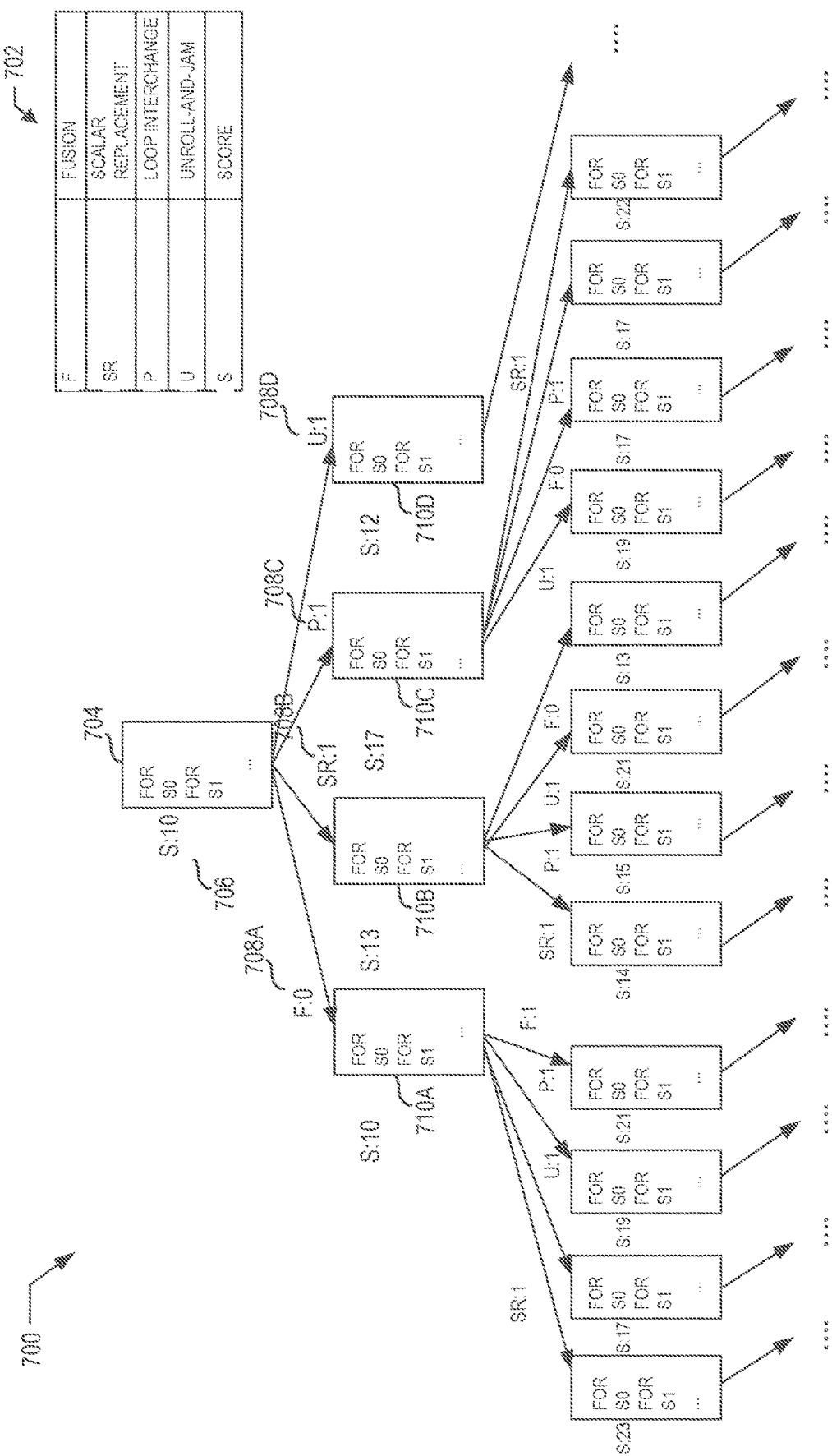
FIG. 7 illustrates an example search tree of code variants and edges annotated with actions corresponding to compiler transformations.

FIG. 7 illustrates an example search tree 70o of code variants and edges, annotated with parameters 702 corresponding to compiler transformations and/or scores. The search tree 700 includes an example root node 704, and its corresponding score 706. Stemming from the root node 704 are example code variants 710A, 710B. 710C, 710D, each representing the code variant generated by applying a different action 708A. 708B, 708C. 708D to the root node 704. For example, action 708A, "F:0," represents "no fusion." action 708B. "SR:1," represents "scalar replacement," action 708C, "P:1," represents "loop interchange." and action 708D, "U:1," represents "unroll-and-jam."

Figure 8:
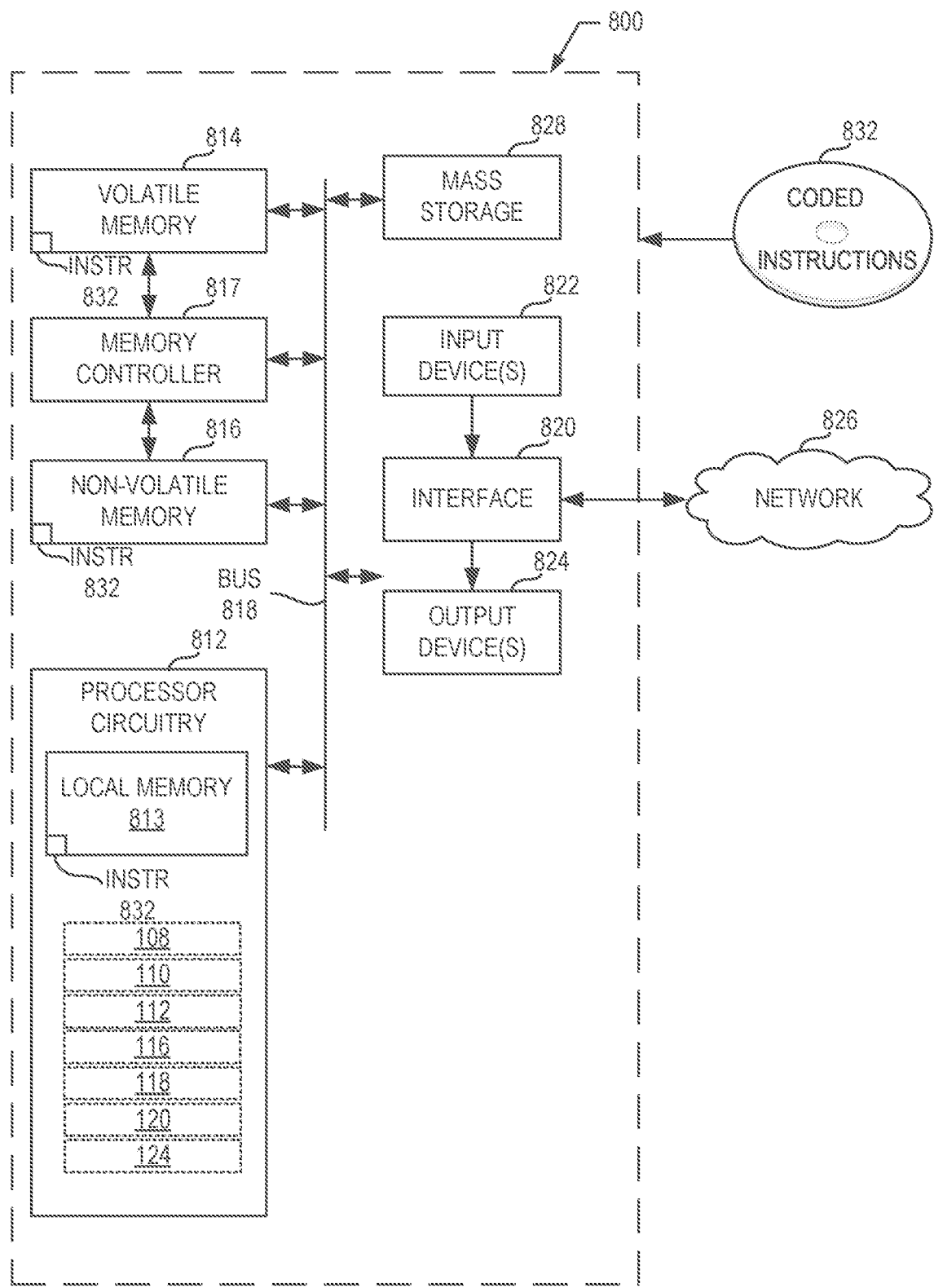
FIG. 8 is a block diagram of an example processing platform including processor circuitry structured to execute the example machine readable instructions of FIG. 2 to implement the compiler optimization circuitry 104 of FIG. 1.

FIG. 8 is a block diagram of an example processor platform 800 structured to execute and/or instantiate the machine readable instructions and/or operations of FIG. 2 to implement the compiler optimization system 100 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 825. The processor circuitry 825 of the illustrated example is hardware. For example, the processor circuitry 825 can be implemented by one or more integrated circuits, logic circuits. FPGAs microprocessors, CPUs. GPUs, DSPs, and/or microcontrollers from any desired family or manufacturer. The processor circuitry 825 may be implemented by one or more semiconductor based (e.g., silicon based) devices. In this example, the processor circuitry 825 implements the example source code score calculating circuitry 108, the example search tree status checking circuitry 110, the example source code feature extracting circuitry 112, the example feature embedding circuitry 114, the example profitability calculating circuitry 116, the example search tree pruning circuitry 118 the example transformation selecting circuitry 120, the example code variant generating circuitry 122, and the example machine learning (ML) model parameter updating circuitry 124.

The processor circuitry 825 of the illustrated example includes a local memory 805 (e.g., a cache, registers, etc.). The processor circuitry 825 of the illustrated example is in communication with a main memory including a volatile memory 815 and a non-volatile memory 820 by a bus 830. The volatile memory 815 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 820 may be implemented by flash memory and/or any other desired type of memory device. Access to the main memory 815, 820 of the illustrated example is controlled by a memory controller.

The processor platform 800 of the illustrated example also includes interface circuitry 845. The interface circuitry 845 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 840 are connected to the interface circuitry 845. The input device(s) 840 permit(s) a user to enter data and/or commands into the processor circuitry 825. The input device(s) 840 can be implemented by, for example, an audio sensor, a microphone, a camera (still or video), a keyboard, a button, a mouse, a touchscreen, a track-pad, a trackball, an isopoint device, and/or a voice recognition system.

One or more output devices 850 are also connected to the interface circuitry 845 of the illustrated example. The output devices 850 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 845 of the illustrated example, thus, typically includes a graphics driver card, a graphics driver chip, and/or graphics processor circuitry such as a GPU The interface circuitry 845 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 810. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 835 to store software and/or data Examples of such mass storage devices 835 include magnetic storage devices, optical storage devices, floppy disk drives. HDDs. CDs, Blu-ray disk drives, redundant array of independent disks (RAID) systems, solid state storage devices such as flash memory devices, and DVD dries.

The machine executable instructions 832, which may be implemented by the machine readable instructions of FIG. 2, may be stored in the mass storage device 835, in the volatile memory 815, in the non-volatile memory 820, and/or on a removable non-transitory computer readable storage medium such as a CD or DVD.

Figure 9:
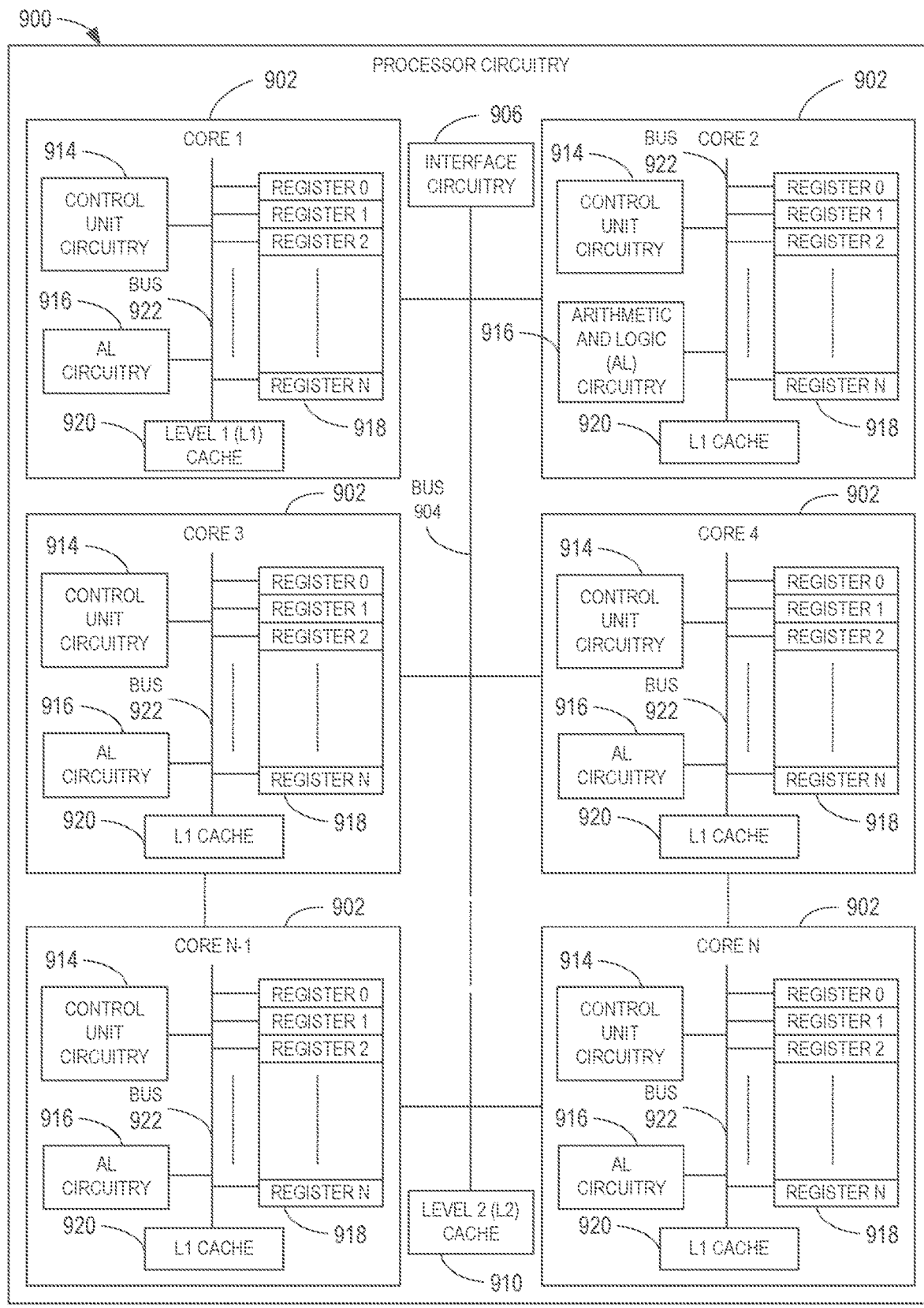
FIG. 9 is a block diagram of an example implementation of the processor circuitry of FIG. 8.

FIG. 9 is a block diagram of an example implementation of the processor circuitry 825 of FIG. 8. In this example, the processor circuitry 825 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 2.

The cores 902 may communicate by an example first bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 815, 820 of FIG. 8). Typically, higher levels of memory in the hierarchy exhibit lower access time and have smaller storage capacity than lower levels of memory Changes in the various levels of the cache hierarchy are managed (e.g., coordinated) by a cache coherency policy.

Each core 902 may be referred to as a CPU. DSP. GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein A GPU or other programmable device can also be an accelerator. Accelerators may be on-board the processor circuitry, in the same chip package as the processor circuitry and/or in one or more separate packages from the processor circuitry.

Figure 10:
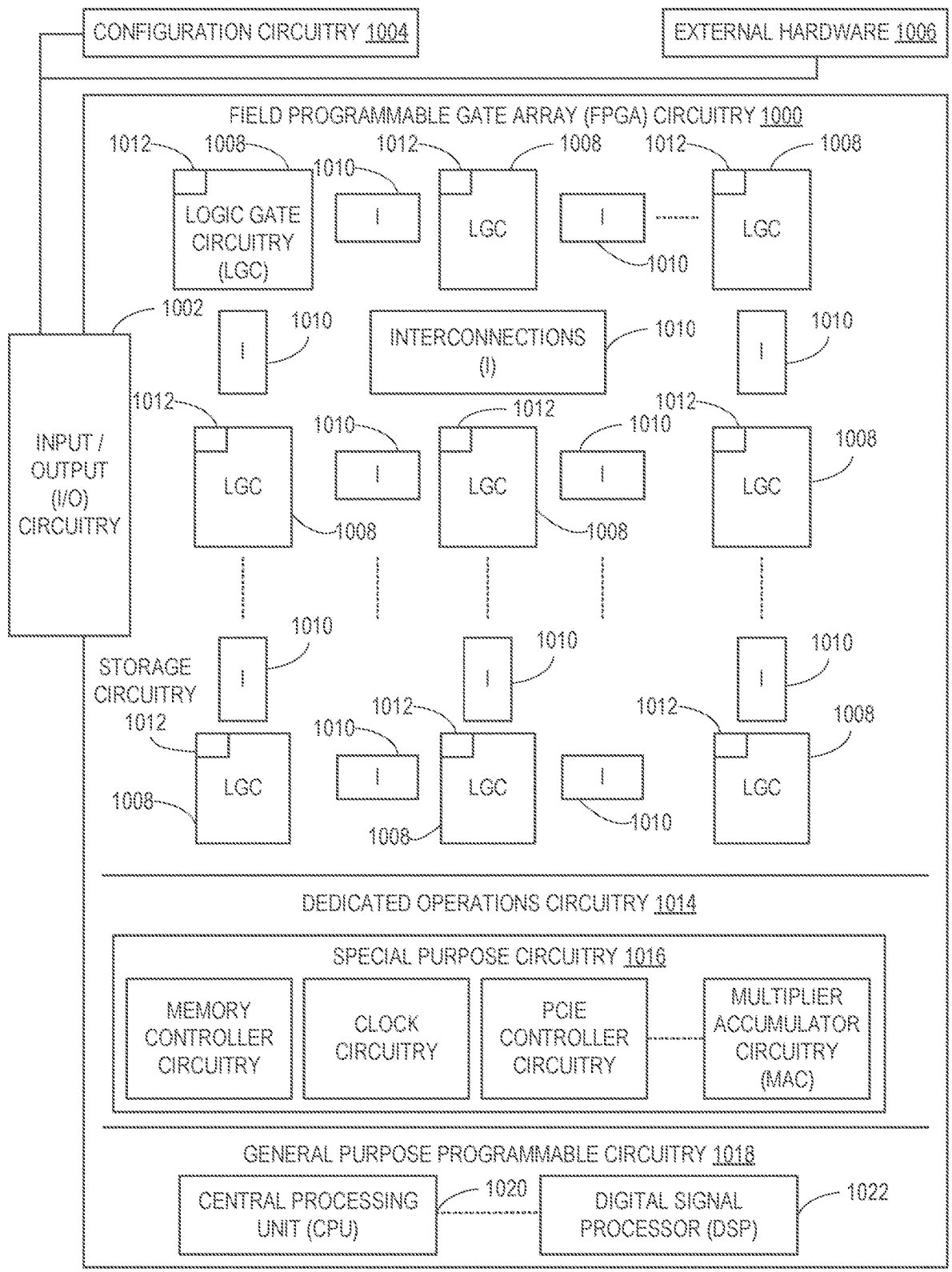
FIG. 10 is a block diagram of another example implementation of the processor circuitry of FIG. 8.

FIG. 10 is a block diagram of another example implementation of the processor circuitry 825 of FIG. 8. In this example, the processor circuitry 825 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 2 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 2. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIG. 2. As such, the FPGA circuitry 1000 may be structured to effectively instantiate some or all of the machine readable instructions of the flowchart of FIG. 2 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 2 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIG. 2 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates. Or gates. Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field Examples of such special purpose circuitry 1016 include memory (e.g., DRAM) controller circuitry. PCIe controller circuitry, clock circuitry, transceiver circuitry, memory, and multiplier-accumulator circuitry. Other types of special purpose circuitry may be present In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 825 of FIG. 8, many other approaches are contemplated. For example, as mentioned above, modern FPGA circuitry mas include an on-board CPU, such as one or more of the example CPU) 1020 of FIG. 10. Therefore, the processor circuitry 825 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 2 may be executed by one or more of the cores 902 of FIG. 9 and a second portion of the machine readable instructions represented by the flowchart of FIG. 2 may be executed by the FPGA circuitry 1000 of FIG. 10.

In some examples, the processor circuitry 825 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 825 of FIG. 8, which may be in one or more packages. For example, the XPU may include a CPU in one package, a DSP in another package, a GPU in yet another package, and an FPGA in still yet another package.

Figure 11:
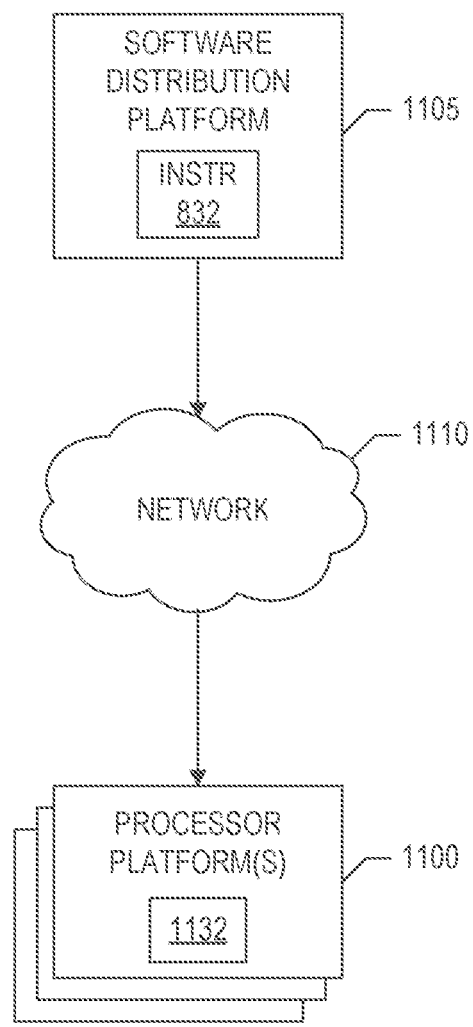
FIG. 11 is a block diagram of an example software distribution platform (e.g., one or more servers) to distribute software (e.g., software corresponding to the example machine readable instructions of FIG. 2) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 1132 of FIG. 11 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions represented by the flowcharts of FIG. 2. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 1132, which may correspond to the example machine readable instructions represented by the flowcharts of FIG. 2, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1105. For example, the software, which may correspond to the example machine readable instructions represented by the flowchart of FIG. 2 may be downloaded to the example processor platform 1100, which is to execute the machine readable instructions 1132 to implement the compiler optimization system 100 of FIG. 1. In some example, one or more servers of the software distribution platform 1105 periodically offer, transmit, and/ or force updates to the software (e.g., the example machine readable instructions 1132 of FIG. 11) to ensure improvements, patches, updates, etc., are distributed and applied to the software at the end user devices.

Example methods, apparatus, systems, and articles of manufacture for machine learning-guided compiler optimizations for register-based hardware architectures are disclosed herein. Further examples and combinations thereof include the following:

Example 1 includes a non-transitory computer readable medium comprising instructions that, when executed, cause a machine to at least select a register-based compiler transformation to apply to source code at a current position in a search tree, determine whether the search tree is in need of pruning based on an output of a query to a machine learning (ML) model, in response to determining the search tree is in need of pruning, prune the search tree at the current position, in response to applying the selected register-based compiler transformation to the source code, generate a code variant, calculate a score associated with the source code at the current position in the search tree, and update parameters of the machine learning (ML) model to include the calculated score.

Example 2 includes the non-transitory computer readable medium of example 1, wherein the instructions, when executed, cause the machine to calculate a score associated with the source code to determine the profitability of exploring a given path of code variants, the score being inversely proportional to at least a memory load or memory store count of the source code.

Example 3 includes the non-transitory computer readable medium of example 1, wherein the query to the machine learning (ML) model is run using the feature dependency vector as input.

Example 4 includes the non-transitory computer readable medium of example 1, wherein the parameters of the machine learning (ML) model are updated recursively.

Example 5 includes the non-transitory computer readable medium of example 4, wherein the parameters of the machine learning (ML) model include at least a score or action associated with the code variant.

Example 6 includes the non-transitory computer readable medium of example 1, wherein the instructions, when executed, cause the machine, in order to determine that exploration of the path of code variants is not profitable, to compare the score associated with the source code at the current position against a threshold score value.

Example 7 includes the non-transitory computer readable medium of example 6, wherein the threshold score value is a predetermined value.

Example 8 includes the non-transitory computer readable medium of example 1, wherein the determination of whether the search tree is in need of pruning is made by comparing the output of the query to the machine learning (ML) model against a threshold profitability value.

Example 9 includes the non-transitory computer readable medium of example 8, wherein the threshold profitability value is a predetermined value.

Example 10 includes the non-transitory computer readable medium of example 1, wherein the register-based compiler transformations that may be applied to the source code include at least one of scalar replacement, unroll-and-jam, loop interchange, or loop Fusion.

Example 11 includes the non-transitory computer readable medium of example 1, wherein the instructions, when executed cause the machine to determine a metric associated with exploration of a given path of code variants stemming from the source code, and in response to the determination that exploration of the path of code variants is not profitable extract features from the source code, and embed the extracted features into a feature dependency vector.

Example 12 includes a method to perform machine learning-guided compiler optimizations for register-based hardware architectures comprising selecting a register-based compiler transformation to apply to source code at a current position in a search tree, determining whether the search tree is in need of pruning based on an output of a query to a machine learning (ML) model, in response to determining the search tree is in need of pruning, pruning the search tree at the current position, in response to applying the selected register-based compiler transformation to the source code, generating a code variant, calculating a score associated with source code at the current position, updating parameters of the machine learning (ML) model to include the calculated score.

Example 13 includes the method of example 12, wherein the profitability of exploring a given path of code variants stemming from source code at the current position is determined by calculating a score associated with the source code, the score being inversely proportional to at least a memory load or memory store count of the source code.

Example 14 includes the method of example 12, wherein the query to the machine learning (ML) model is run using the feature dependency vector as input.

Example 15 includes the method of example 12, wherein the parameters of the machine learning (ML) model are updated recursively.

Example 16 includes the method of example 15, wherein the parameters of the machine learning (ML) model include at least a score or action associated with the code variant.

Example 17 includes the method of example 12, wherein the determination that exploration of the path of code variants is not profitable is made by comparing the score associated with the source code at the current position against a threshold score value.

Example 18 includes the method of example 12, wherein the determination of whether the search tree is in need of pruning is made bs comparing the output of the query to the machine learning (ML) model against a threshold profitability value.

Example 19 includes the method of example 11, further comprising determining a metric associated with exploration of a given path of code variants stemming from the source code, and in response to determining that exploration of the path of code is not profitable extracting features from the source code, and embedding the extracted features into a feature dependency vector.

Example 20 includes the method of example 12, wherein the register-based compiler transformations that may be applied to the source code include at least one of scalar replacement, unroll-and-jam, loop interchange, or loop fusion.

Example 21 includes an apparatus to perform machine learning-guided compiler optimizations for register-based hardware architectures comprising interface circuitry, processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate transformation selecting circuitry to select a register-based compiler transformation to apply to source code at a current position in a search tree, search tree pruning circuitry to prune the search tree in response to determining the search tree at the current position is in need of pruning, code variant generating circuitry to apply a selected register-based compiler transformation to the source code, and machine learning (ML) model parameter updating circuitry to calculate a score associated with the source code at the current position in the search tree and update parameters of the ML model to include the calculated score.

Example 22 includes the apparatus of example 21, wherein the ML model parameter updating circuitry updates the parameters of the machine learning (ML) model recursively.

Example 23 includes the apparatus of example 21, wherein the search tree pruning circuitry determines whether the search tree is in need of pruning by comparing the output of the query to the machine learning (ML) model against a threshold profitability value.

Example 24 includes the apparatus of example 21, Further including profitability calculating circuitry to determine a metric associated with exploration of a given path of code variants stemming from the source code, and source code feature extracting circuitry to extract features from the source code in response to determining that exploration of the path of code is not profitable, and feature embedding circuitry to embed the extracted features into a feature dependency vector.

Example 25 includes the apparatus of example 21, wherein the transformation selecting circuitry chooses a register-based compiler transformation to apply to the source code, the register-based compiler transformations including at least one of scalar replacement, unroll-and-jam, loop interchange, or loop fusion. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example 26 is an edge computing gateway, comprising processing circuitry to perform any of Examples 12-20.

Example 27 is an edge computing node, comprising processing circuitry to perform any of Examples 12-20.

Example 28 is a base station, comprising a network interface card and processing circuitry to perform any of Examples 12-20.

Example 29 is a computer-readable medium comprising instructions to perform any of Examples 12-20.

The following claims are hereby incorporated into this Detailed Description by this reference, with each claim standing on its own as a separate embodiment of the present disclosure.

What is claimed is:

1. A non-transitory computer readable medium comprising instructions that, when executed, cause a machine to at least:
   select a register-based compiler transformation of register-based compiler transformations to apply to source code at a current position in a search tree;
   determine whether the search tree is in need of pruning based on an output of a query to a machine learning (ML) model;
   in response to determining the search tree is in need of pruning, prune the search tree at the current position;
   in response to applying the selected register-based compiler transformation to the source code, generate a code variant;
   calculate a score associated with the source code and the generated code variant at the current position in the search tree; and
   update parameters of the machine learning (ML) model to include the calculated score.

2. The non-transitory computer readable medium of claim 1, wherein the instructions, when executed, cause the machine to calculate a score associated with the source code to determine a profitability of exploring a given path of code variants, the score being proportional to at least a memory load or memory store count of the source code.

3. The non-transitory computer readable medium of claim 1, wherein the query to the machine learning (ML) model is run using a feature dependency vector as an input.

4. The non-transitory computer readable medium of claim 1, wherein the parameters of the machine learning (ML) model are updated recursively.

5. The non-transitory computer readable medium of claim 4, wherein the parameters of the machine learning (ML) model include at least a score or action associated with the code variant.

6. The non-transitory computer readable medium of claim 1, wherein the instructions, when executed, cause the machine to compare the score associated with the source code at the current position against a threshold score value in order to determine that exploration of a path of code variants is not profitable.

7. The non-transitory computer readable medium of claim 6, wherein the threshold score value is a predetermined value.

8. The non-transitory computer readable medium of claim 1, wherein the determination of whether the search tree is in need of pruning is made by comparing the output of the query to the machine learning (ML) model against a threshold profitability value.

9. The non-transitory computer readable medium of claim 8, wherein the threshold profitability value is a predetermined value.

10. The non-transitory computer readable medium of claim 1, wherein the register-based compiler transformations that are applied to the source code include at least one of scalar replacement, unroll-and-jam, loop interchange, or loop fusion.

11. The non-transitory computer readable medium of claim 1, wherein the instructions, when executed cause the machine to:
determine a metric associated with exploration of a given path of code variants stemming from the source code; and
in response to a determination that exploration of the path of code variants is not profitable:
extract features from the source code; and
embed the extracted features into a feature dependency vector.

12. A method to perform machine learning-guided compiler optimizations for register-based hardware architectures comprising:
selecting a register-based compiler transformation of register-based compiler transformations to apply to source code at a current position in a search tree; determining whether the search tree is in need of pruning based on an output of a query to a machine learning (ML) model;
in response to determining the search tree is in need of pruning, pruning the search tree at the current position;
in response to applying the selected register-based compiler transformation to the source code, generating a code variant;
calculating a score associated with source code and the generated code variant at the current position; and
updating parameters of the machine learning (ML) model to include the calculated score.

13. The method of claim 12, wherein a profitability of exploring a given path of code variants stemming from source code at the current position is determined by calculating a score associated with the source code, the score being proportional to at least a memory load or memory store count of the source code.

14. The method of claim 12, wherein the query to the machine learning (ML) model is run using a feature dependency vector as an input.

15. The method of claim 12, wherein the parameters of the machine learning (ML) model are updated recursively.

16. The method of claim 15, wherein the parameters of the machine learning (ML) model include at least a score or action associated with the code variant.

17. The method of claim 13, wherein the determination that exploration of the path of code variants is not profitable is made by comparing the score associated with the source code at the current position against a threshold score value.

18. The method of claim 12, wherein the determination of whether the search tree is in need of pruning is made by comparing the output of the query to the machine learning (ML) model against a threshold profitability value.

19. The method of claim 12, further comprising:
determining a metric associated with exploration of a given path of code variants stemming from the source code; and
in response to determining that exploration of the path of code is not profitable:
extracting features from the source code; and
embedding the extracted features into a feature dependency vector.

20. The method of claim 12, wherein the register-based compiler transformations that are applied to the source code include at least one of scalar replacement, unroll-and-jam, loop interchange, or loop fusion.

21. An apparatus to perform machine learning-guided compiler optimizations for register-based hardware architectures comprising:
an interface circuitry;
instructions;
a processor circuitry to at least one of execute or implement the instructions to:
select a register-based compiler transformation of register-based compiler transformations to apply to source code at a current position in a search tree;
prune the search tree at the current position in response to determining the search tree at the current position is in need of pruning based on an output of a query to a machine learning (ML) model;
apply a selected register-based compiler transformation to the source code to generate a code variant;
calculate a score associated with the source code and the generated code variant at the current position in the search tree; and
update parameters of the ML model to include the calculated score.

22. The apparatus of claim 21, wherein the processor circuitry is to update the parameters of the machine learning (ML) model recursively.

23. The apparatus of claim 21, wherein the processor circuitry is to determine whether the search tree is in need of pruning by comparing the output of the query to the machine learning (ML) model against a threshold profitability value.

24. The apparatus of claim 21, wherein the processor circuitry is to:
determine a metric associated with exploration of a given path of code variants stemming from the source code; and
extract features from the source code in response to determining that exploration of the path of code is not profitable; and
embed the extracted features into a feature dependency vector.

25. The apparatus of claim 21, wherein the register-based compiler transformations include at least one of scalar replacement, unroll-and-jam, loop interchange, or loop fusion.

\* \* \* \* \*